Aug. 21, 1928.
W. H. GOODMAN
1,681,884
ELECTRICAL CONDENSER
Filed Feb. 12, 1923
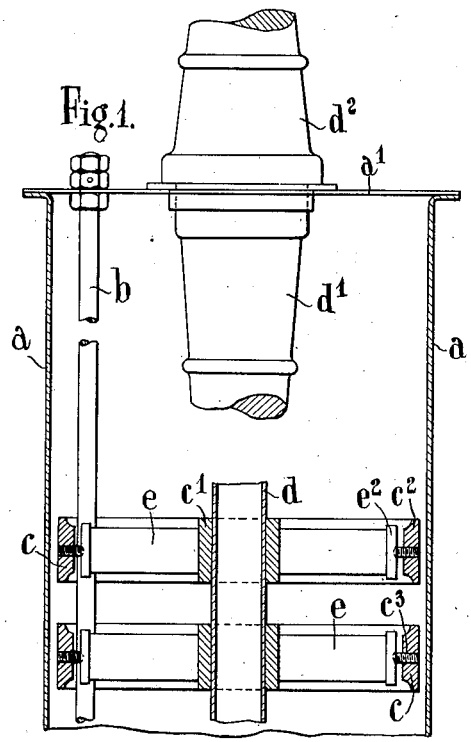
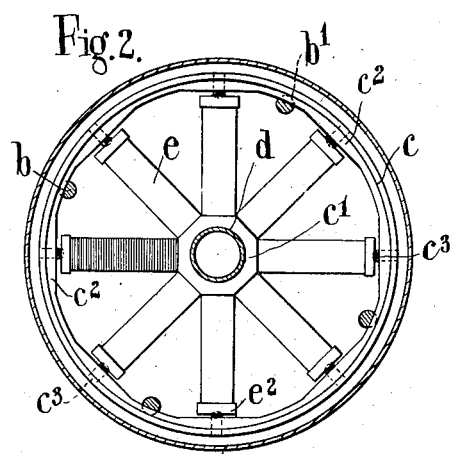
INVENTOR
William Henry Goodman
BY
H. H. Van Deventer
ATTORNEY Patented Aug. 21, 1928.

1,681,884

UNITED STATES PATENT OFFICE.

WILLIAM HENRY GOODMAN, OF KENSINGTON, LONDON, ENGLAND, ASSIGNOR TO DUBILIER CONDENSER CORPORATION, OF NEW YORK, N. Y., A CORPORATION OF DELAWARE.

ELECTRICAL CONDENSER.

Application filed February 12, 1923, Serial No. 618,695, and in Great Britain March 22, 1922.

This invention relates to electrical condensers and is particularly applicable to high potential condensers comprising a casing having condenser surface elements connected together in series and disposed in a plurality of sets connected in parallel, the arrangement being such that the high potential elements of each set are located in a central portion of the casing and the low potential elements positioned adjacent a wall of the casing.

The object of the invention is to provide an improved condenser including the construction thereof and the arrangement of the condenser elements.

The invention enables condensers to be manufactured of large capacity which occupy comparatively small space, and further, condensers of very high voltage and for carrying large high frequency currents may be efficiently constructed.

The invention comprises condenser plates or units grouped in appropriate sets which are diposed substantially radially around a centre or axis. According to the invention a plurality of groups of radially arranged sets of condenser plates or units may be embodied together in spaced relationship or disposed coaxially.

The invention also consists in a means of mounting condenser plates comprising a central abutment element, an annular abutment element and means whereby pressure can be brought to bear upon the condenser plates between the two abutment elements to rigidly clamp the plates together in block form.

Further features of the invention will hereinafter appear and be delimited by the claims.

In the accompanying drawings:—

Figure 1 is a fragmentary sectional elevation of an electrical condenser according to one form of the invention, and Figure 2 is a sectional plan of the condenser according to Figure 1.

In carrying the invention into effect according to one convenient mode, as applied to a condenser having characteristics of the kind above specified, a suitable casing $a$, preferably of cylindrical shape, is provided. In the present instance it is preferred to arrange this casing so that it may stand vertically but it is to be understood that the invention may be applied to a horizontally lying casing or box.

The upper end closure or lid $a'$ of the casing $a$ is provided with a series (for example, four) of elements, rods or posts $b$ adapted to extend substantially to the lower end of the casing. These rods are adapted to act as conductors or terminals (low potential) in parallel, for the electric circuit, and upon these rods is mounted a plurality of metal annular abutment elements or ring members $c$ of less circumference than that of the casing $a$ and arranged coaxially and spaced apart. The annular elements may be secured to or mounted upon the rods $b$ by any suitable means; for example, the rods may be cut away, as at $b'$, to provide shoulders for the reception of the annular element whereby the rods act as distance pieces in addition to supporting the elements.

Around the axis of the casing a metal support and conductor $d$ preferably of tubular form is located and secured in the end closure or top $a'$ of the casing $a$. This central metal conductor is adapted to constitute the high potential terminal of the condenser and the upper end thereof is enclosed by a downwardly depending sleeve $d'$ of insulating material. The connection of the tubular conductor with the end closure is suitably insulated therefrom, so that by means of this insulation and the insulation sleeve the high potential terminal is isolated from the casing walls at the part where it might be otherwise in dangerous proximity thereto.

Similarly, the lead and the high potential terminal exterior to the casing may be provided with suitable insulation which may be in the form of a sleeve or like member $d^2$ extending away from or upwardly of the top or lid $a'$.

In the plane of each of the annular elements is a ring or collar or equivalent device $c'$ adapted to serve as a central abutment for the condenser plates, mounted upon the tubular conductor $d$ and in electrical connection therewith. The outer surfaces of these collars are preferably formed of polygonal form, for example, in the present case it is preferred that the collars should in plan be octagonal (see Figure 2). Radially opposite the octagonal facets thus provided and upon the inner periphery of the annular element or device $c$ thickened portions $c^2$ may be formed so that a face is presented towards the axis of the casing which is more or less parallel with a facet on the octagonal collar $c'$.

In lieu of providing a collar such as $c'$, an independent block may be provided in association with each set of condenser units. These blocks are on the one hand bedded against the adjacent condenser units and on the other hand seated upon the conductor $d$ for which purpose the blocks may be provided with a correspondingly arcuate face, the pressure under which the condenser units are clamped together being sufficient to maintain these blocks in position.

Between these faces upon the annular member and the facets on the collar or equivalent element carried by the conductor $d$, condenser plates $e$ are adapted to be mounted. It is preferred to assemble the condenser plates to form a block and support the set thus formed between the abutment collar $c'$ and the abutment annulus $c$, so that each set of condenser elements is radially arranged round the axial conductor. The radial condenser sets may each comprise a plurality of condenser units, the metallic plates of which are united in parallel, the units of each set being connected together in series or in parallel according to the nature of the condenser being constructed. The condenser units are diagrammatically indicated in connection with one set shown on the left of Figure 2.

The condenser plates may be of any suitable shape, for example, they may be circular, rectangular or polygonal.

It will be observed that the condenser surface elements lie parallel with the facets of the octagonal collar $c'$ or as tangents to circles having their centres upon the axis of the conductor $d$; that is, the plates $e$ face towards the central axis of the condenser, and the clamping devices comprising the central abutment $c'$ and the annular element $c$, exert pressure upon each set of plates or unit in a substantially radial direction to secure the units together adjacent the axis by holding them tightly against the collar $c'$.

Any suitable means may be employed for mounting the condenser sets in position between the annuli and the collars. For instance, a condenser set may be conveniently clamped by a set screw $c^3$ mounted in the annular element $c$ and arranged coaxial with the centre line passing through a set of elements $e$. This set screw is adapted to bear upon a suitable end piece arranged at the outer end of each set or block of condenser units. By reason of the annular formation of the element $c$ very great pressure may be brought to bear upon the condenser plates, such that when clamped up they virtually form an integral block from a mechanical point of view.

If desired, the engagement between the screw threaded means $c^3$ and end pieces $e^2$ may be in the nature of a ball and socket to accommodate any irregularities which the condenser plates or other parts may possess.

The electrical connections are such that the condenser units are in parallel or series as above indicated and the sets of units are connected together in parallel to the casing terminals, on the one hand by the depending posts or rods $b$ and on the other hand by the central conductor $d$.

By the above described arrangement it will be observed that the condenser units of low potential lie adjacent the annuli $c$ or casing $a$ while the high potential units lie adjacent the central conductor $d$ or axis of the casing.

Instead of making the various members supporting the condenser sets of metal, other material, for example insulating or insulated material, may be employed providing the necessary leads and connections are provided appropriately to connect the sets of elements in parallel.

As an alternative to providing separate annuli carried by rods or posts, similar elements may be mounted upon or incorporated in a frame, either suspended within the casing or carried from the lower end, or the casing itself may be employed to serve the double purpose of enclosing the condenser and supporting radially arranged sets of condenser units. For this purpose the casing may be suitably shaped internally to provide a seating or mounting for the sets of units. If necessary, suitable insulation covering may be provided upon the exterior of the casing.

In carrying the invention into effect according to another convenient mode, the support at the outer extremity of the condenser sets, such as provided by the annular elements or framework, may be dispensed with and a rod or post mounted at right angles to the axis of the condenser may be caused to pass centrally through the condenser plates and engage by screw threaded or other suitable means a head piece, so that pressure may be brought to bear to hold the plates or units together in the block form upon the post. Instead of providing a single post arranged radially, a plurality of posts may be employed extending from a central collar or other support and disposed parallel to a radial line passing through the centre of the condenser plates.

According to a modification, instead of arranging for the output or return from the condenser to take place from the same end thereof as the input, the output may be effected from the bottom of the condenser or from that end which is opposite to the input, with a view to equalizing the current distribution. For this purpose the rods or equivalent members *b* may be extended beneath the condenser sets inwardly to a central point to which the output lead may be connected.

Although the present invention has been described mainly with reference to a condenser in which the units are arranged according to their potentials, the invention may be applied to other types of condensers wherein the radial arrangement of sets may be adopted with benefit.

Having now described my invention, what I claim as new and desire to secure by Letters Patent is:—

1. An electrical condenser comprising a series of sets of plates or units arranged substantially radially about an axis, the series of sets being coaxially disposed and spaced apart along said axis, and devices acting in a substantially radial direction for clamping said sets together at said axis.

2. An electrical condenser comprising a central support, condenser plates grouped to form units in substantially radial arrangement about said support as an axis, said plates facing said support, and additional condenser plates spaced from the first-named plates along said support, and likewise grouped to form units in substantially radial arrangement about said support as an axis and having their plates facing said support.

3. An electrical condenser comprising a central support, condenser plates grouped to form units arranged about said support as an axis, additional condenser plates spaced from the first plates along said support and grouped to form units arranged about said support as an axis, and clamping devices acting in substantially radial direction to secure said plates against said support.

4. An electrical condenser comprising a central support, condenser plates grouped to form units arranged about said support as a central axis, said plates facing said support, additional condenser plates spaced from the first-named plates along said axis and likewise arranged about said support as an axis, and facing said support, and clamping devices acting in substantially radial direction to secure all of said units in position.

5. An electrical condenser comprising a casing, a central support and conductor in said casing, an abutment upon said support, condenser plates grouped to form units in substantially radial arrangement about said support as an axis, said units engaging the abutment at one end, an annular member surrounding said units to enable them to be engaged at their opposite ends and held in position with reference to said support, and one or more rods forming terminals or conductors for the opposite ends of said units.

6. An electrical condenser comprising a central support, condenser plates grouped to form units in substantially radial arrangement about said support as an axis, additional condenser plates spaced from the first named plates along said support, and likewise grouped to form units in substantially radial arrangement about said support as an axis, clamping devices encircling each group of said units, and a plurality of rods joined to said clamping devices to connect same and said units.

In testimony whereof I have signed my name to this specification.

WILLIAM HENRY GOODMAN.